March 21, 1933.  E. C. DUER  1,902,768
ROTARY INTERNAL COMBUSTION ENGINE
Filed May 30, 1930  4 Sheets-Sheet 1

Fig. 1.

Inventor:
Edward C. Duer.
By Martin P. Smith
Attorney.

March 21, 1933. E. C. DUER 1,902,768
ROTARY INTERNAL COMBUSTION ENGINE
Filed May 30, 1930 4 Sheets-Sheet 2

Fig. 2.

Inventor
Edward C. Duer.
By [signature]
Attorney.

March 21, 1933.　　　　E. C. DUER　　　　1,902,768
ROTARY INTERNAL COMBUSTION ENGINE
Filed May 30, 1930　　　4 Sheets-Sheet 4

Fig. 4.

Inventor.
Edward C. Duer.
By Martin C. Smith
Attorney.

Patented Mar. 21, 1933

1,902,768

UNITED STATES PATENT OFFICE

EDWARD C. DUER, OF LOS ANGELES, CALIFORNIA, ASSIGNOR OF ONE-HALF TO JOHN HARRAH, OF LOS ANGELES, CALIFORNIA

ROTARY INTERNAL COMBUSTION ENGINE

Application filed May 30, 1930. Serial No. 457,551.

My invention relates to a rotary internal combustion engine and the structure herein disclosed is an improvement upon a similar engine that forms the subject matter of my copending application for U. S. Letters Patent filed March 25, 1929, Serial No. 349,869.

The principal objects of my present invention are, to generally improve upon and simplify the construction of the engine set forth in my aforesaid copending patent application as well as other similar forms of rotary internal combustion engines, further, to provide an engine wherein a pressure actuated piston is caused to move continuously in one and the same direction under the influence of periodic power impulses, so as to produce a continuous flow of power without any reversal of direction of movement of the piston, further, to arrange a plurality of radially disposed abutments that cooperate with the rotor and provide heads for the combustion chambers in which the ignition combustion an expansion of pre-compressed gaseous fuel charges take place for producing the pressure impulses upon the rotary piston and further, to provide relatively simple and effective means for delivering the compressed gaseous fuel charges into the circular chamber traversed by the piston head of the rotor, to ignite said charges at the proper times and to effect the subsequent exhaust of the burnt products of combustion from the combustion chambers.

Further objects of my invention are, to provide improved means for moving the radially disposed abutments inwardly and outwardly in proper time relation to the movement of the piston head on the rotor, further, to utilize the radially disposed abutment members as pistons for compressing air that is forced into the combustion chambers with the gaseous fuel charges and further, to provide simple and efficient means for compressing the gaseous fuel charges and forcing the same into the combustion chambers that are formed successively between the piston head of the rotor and the radially disposed abutments.

Further objects of my invention are, to provide means for effecting in a relatively simple manner, variable compression of the gaseous fuel charges that enter the combustion chambers and further, to provide an engine of the character referred to that is relatively simple in construction and which may be readily assembled or taken apart so as to clearly facilitate assembly, inspection of parts, repairs and replacements.

Still further objects of my invention are, to provide a rotary internal combustion engine that may be manufactured and placed on the market at reasonable cost and which engine has but one rotor that always travels in one and the same direction and thereby produces a steady uninterrupted flow of power that is transmitted directly to the main driving shaft of the engine.

With the foregoing and other objects in view, my invention consists in certain novel features of construction and arrangement of parts that will hereinafter be more fully described and claimed and illustrated in the accompanying drawings, in which:

Referring by numerals to the accompanying drawings which illustrate a practical embodiment of my invention, 10, 10 designate the side or end walls of a short hollow cylindrical housing that encloses the greater portion of the operating parts of the engine and arranged upon and encircling the peripheral wall 11 of the main housing is a secondary housing 12 that may be formed in sections so as to facilitate manufacture and assembly.

Suitably secured to one of the side walls 10 of the main housing is a cylinder 13 and arranged on the ends thereof are short cylinders 14 in which the gaseous fuel charges are compressed.

Extending axially through the main housing, comprising the walls 10 and 11 and through the center of cylinder 13 is a shaft 15 that is journaled in suitably arranged bearings 16.

Formed on shaft 15 within the main housing and adjacent to the end walls 10 thereof are cranks 17 that occupy the same plane and formed on said shaft 15 within the cylinder 13 is a crank 18.

Arranged for reciprocatory movement within the cylinders 14 are pistons that are carried by the outer ends of piston rods 20 and the latter being connected by suitable connecting rods 21 to crank 18.

Leading from a suitably located carburetor (not shown) or other sources of gaseous fuel supply are pipes 22 having branches 23 that enter the ends of the cylinders 14 and located in the branch pipes are inwardly opening check valves 24.

The pistons and their actuating means constitute pumps for compressing gaseous fuel charges and forcing the same into the combustion chambers of the engine.

Arranged within the main housing of the engine between the cranks 17, is a structure that functions as a stator, in that it encloses the rotor and it carries the radially disposed members that function as reciprocating abutments and this structure comprises a pair of spaced disc shaped side members 25 and surrounding the edges thereof and secured thereto is a ring shaped member 26.

Formed in the inner face of the member 26 is a circumferentially disposed half round channel 27 that is traversed by a head carried by the rotor of the engine and formed through member 26 and leading outwardly from this channel 27 is a series of radially disposed chambers 28 and which latter communicate with the chambers in the cylinders 29 that project outwardly from member 26.

Abutments 30 that provide the relatively fixed heads for the combustion chambers in the engine are arranged for sliding movement through the chambers 28 and the chambers in the cylinders 29.

These abutments are substantially cylindrical in form and their inner ends are rounded so as to fit into a groove in the rotor that coincides with groove 27 and the inner portions of each rotor are provided with suitable packing rings 31 that are arranged to prevent leakage of fluid pressure between the abutments and the surrounding walls. The forward inner corner of each abutment is beveled or rounded off as designated by 32 so as to permit the head on the rotor to readily ride past the inner end of the abutment.

The outer end of each reciprocating abutment 30 carries a piston 33 that is mounted for reciprocation within a short cylinder 34 and which latter is positioned on the circumferential wall 11 of the engine housing directly over and concentric with each cylinder 29.

Arranged for operation in the outer portion of each cylinder 34 is a piston 35 and projecting outwardly therefrom through the center of a head 36 that is secured to the outer end of cylinder 34 is a piston rod 37.

Journaled on each crank 17 is a disc 38 and projecting radially from each disc is an arm 39 and these arms project through openings 40 that are formed in a part of the circumferential wall 11 of the housing.

The arms 39 are disposed to the sides of one of the cylinders 34 and carried by the outer ends of these arms is a cross bar 41, to the center of which is connected one of the piston rods 37.

Pivotally connected to the disc 38 are the inner ends of pairs of radially disposed arms 42, there being one pair of arms for each cylinder 34 and the outer ends of each pair of arms 42 are connected to a cross bar 43, similar to the cross bar 41 and to the center of each cross bar 43 is connected the outer end of the corresponding piston rod 37. As a result of the construction just described, the rotary motion of shaft 15 and the cranks 17 thereof, impart reciprocating motion to the piston rods 37 and pistons 35.

Seated in each piston 33 to the sides of the abutment 30 are rods 44 that project inwardly through cylinders 34 and seated in and projecting outwardly from the inner ends of these rods 44 are pins 45.

Secured to these pins are the outer ends of retractible springs 46 and the inner ends of these springs are secured to lugs that project outwardly from the discs 25.

Adjustably mounted on the pairs of arms 39 and 42 are blocks 47 that project toward each other and which engage beneath the ends of the pins 45.

During operation of the engine the blocks 47 engage the ends of a pair of the pins 45 and moves piston 33 and its abutment 30 outwardly against the resistance offered by the spring 46 and as the ends of the pins 45 leave the blocks 47 the tension of springs 46 acts to pull abutment 30 inwardly so that the end of said abutment enters the groove in the periphery of the rotor. In this connection it will be understood that arms 39 and 42 being connected to the cranks 17 on shaft 15 have a slight swinging movement simultaneous with their reciprocating movement and thus the blocks 47 carried by said arms traverse substantially oval paths while the pins 45 that are carried by the abutments traverse straight radial paths which follow the longitudinal axes of the oval paths of travel of said blocks 47 at the inner ends of their travel of blocks 47 or at the ends of the movement toward the crank shaft they engage beneath the ends of the pins 45 and after moving the said pins outwardly and expanding the springs 46, said blocks leave the ends of the pins 45 at the outer ends of the travel of said blocks and permit the pins to move inwardly under the influence of the springs and thereby impart corresponding inward movement to the abutments 30.

This engagement or picking up and release of the pins 45 by the blocks 47 that are carried by arms 39 and 42, is made possible by reason of the fact that the inner ends of said arms are connected to the cranks 17 and therefore said arms swing or vibrate with the rods 41 and 43 as axes. Thus the blocks 47 carried by the swinging or vibrating arms move into and out of position beneath the pins 45 as the ears 39 and 42 are reciprocated, due to their connection with cranks 17.

Formed in member 26 to one side of the openings that are occupied by the abutments 30 is a circumferential duct 48 that distributes gaseous fuel to the valves that control the admission of gaseous fuel to the combustion chambers within the engine and leading from said duct 48 is a branch duct 49.

Leading from the gaseous fuel compression cylinder 14 are branch pipes 50 in wh'ch are located outwardly open check valves 51 and said branch pipes lead to a pipe 52 that is connected to duct 49.

Formed in member 26 and intersecting duct 48 are transversely arranged valve chambers 53, the inner ends thereof communicating with the channel 27 that forms the outer portion of the circumferential rotor chamber.

Formed in the outer portion of member 26 are pockets 54, the inner ends of which communicate with channel 27 immediately adjacent to the inner ends of the chambers 53 and screw seated in these pockets 54 are spark plugs 55 or like ignition devices.

Arranged for reciprocating movement within the inner portion of each valve, chamber 53 is a balanced piston valve 58 provided intermediate its ends with an opening or openings 59 that are adapted to register with the circumferential duct 48 that is intersected by the chambers 53.

Arranged for reciprocating movement in the outer portion of each chamber 53 is a plunger 60 and interposed between each plunger and the adjacent balanced piston valve 58 is an expansive spring 61.

The outer end of each plunger 60 is pivotally connected to the upper end of a radially disposed lever 62 pivoted at 63 to a pin or lug that projects outwardly from the adjacent side wall member 25 and the inner ends of the entire set of levers 62 normally bear on the outer face of a cam ring 64 and projecting outwardly from the face of the latter is a cam lug 65. The mechanism just described provides means for controlling the admission of gaseous fuel charges from duct 48 into the combustion chambers of which channel 27 forms a part.

Formed in the opposite side portion of member 26 is a circumferential compressed air duct 48ª that is a duplicate of duct 48 and arranged on the corresponding side of the stator are valves and a valve actuating means for controlling the admission of compressed air to the combustion chambers of which channel 27 forms a part and these compressed air admission and control parts include valve chambers 53ª, balanced piston valves 58ª having intermediate openings 59ª, plungers 60ª, expansive springs 61ª, levers 62ª fulcrummed at 63ª, a cam disc 64ª and a cam lug 65ª carried by said disc.

The parts just described and which control the admission of air from duct 48ª to the combustion chambers are duplicates and operate the same as the corresponding parts that are utilized for controlling the inlet of gaseous fuel charges into the combustion chamber.

The cam discs 64 and 64ª are concentric with the axis of the crank shaft 15 and they are circumferentially adjustable in order that the positions of the lugs 65 and 65ª may be changed to vary the timing of the valves 58 and 58ª.

Located in the outer end portion of each cylinder 34 is an inlet check valve 66 that is adapted to admit air to the piston chamber within the cylinder and located in the opposite portion of the wall of the cylinder is an outwardly opening check valve 67 that communicates with a duct 68 that leads lengthwise through the cylinder wall and which communicates with a second outwardly opening check valve 69 that is located near the inner end of the cylinder.

Leading from check valve 69 is a pipe or duct 69ª that communicates with the circumferential air duct 48ª in member 26 and which latter is intersected by the air control valve chambers 53ª.

Figure 1:
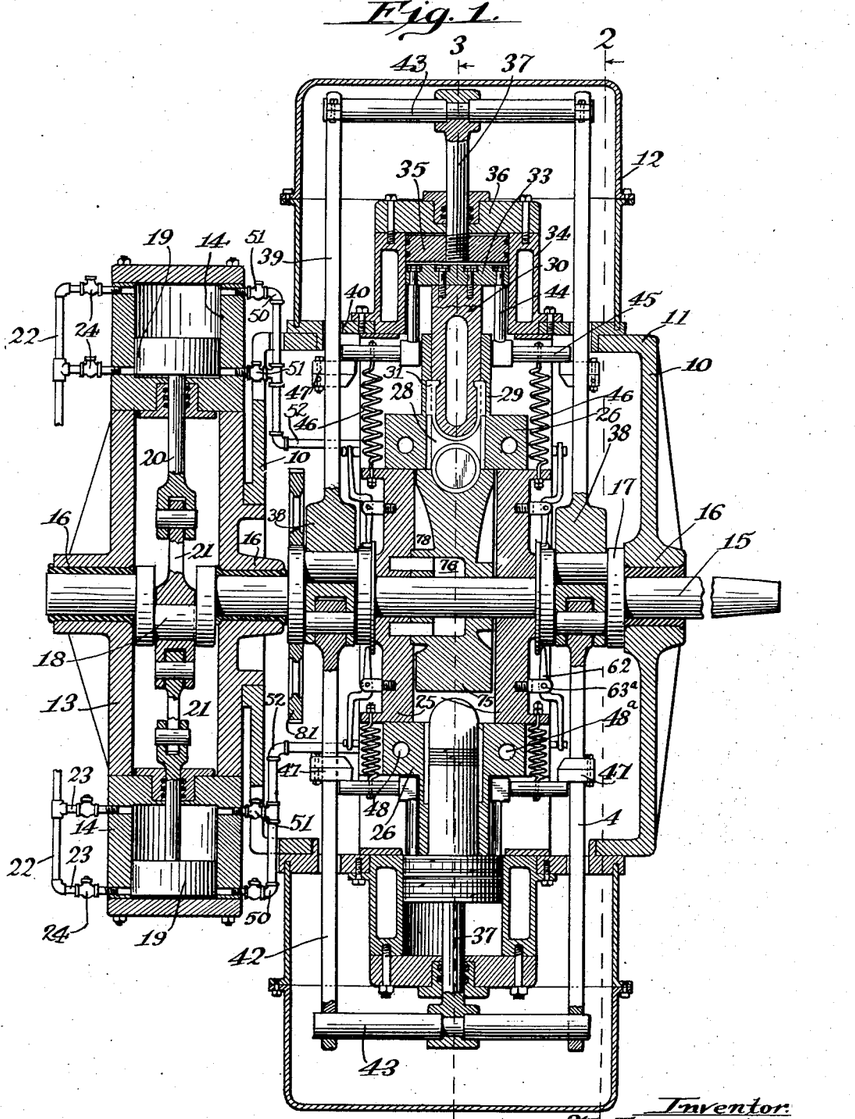
Fig. 1 is a vertical section taken lengthwise through the center of a rotary internal combustion engine constructed in accordance with my invention.
Figure 2:
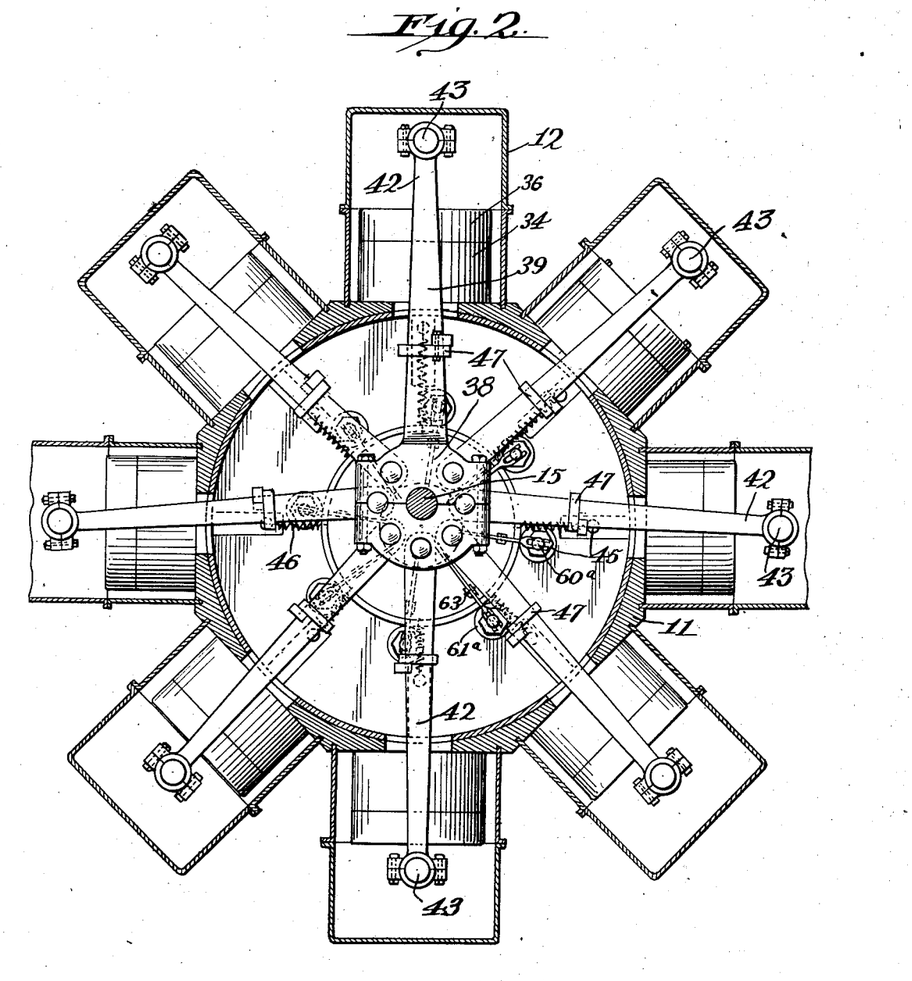
Fig. 2 is a sectional view taken approximately on the line 2—2 of Fig. 1 and with parts of the housing broken away and in section.
Figures 3, 5:
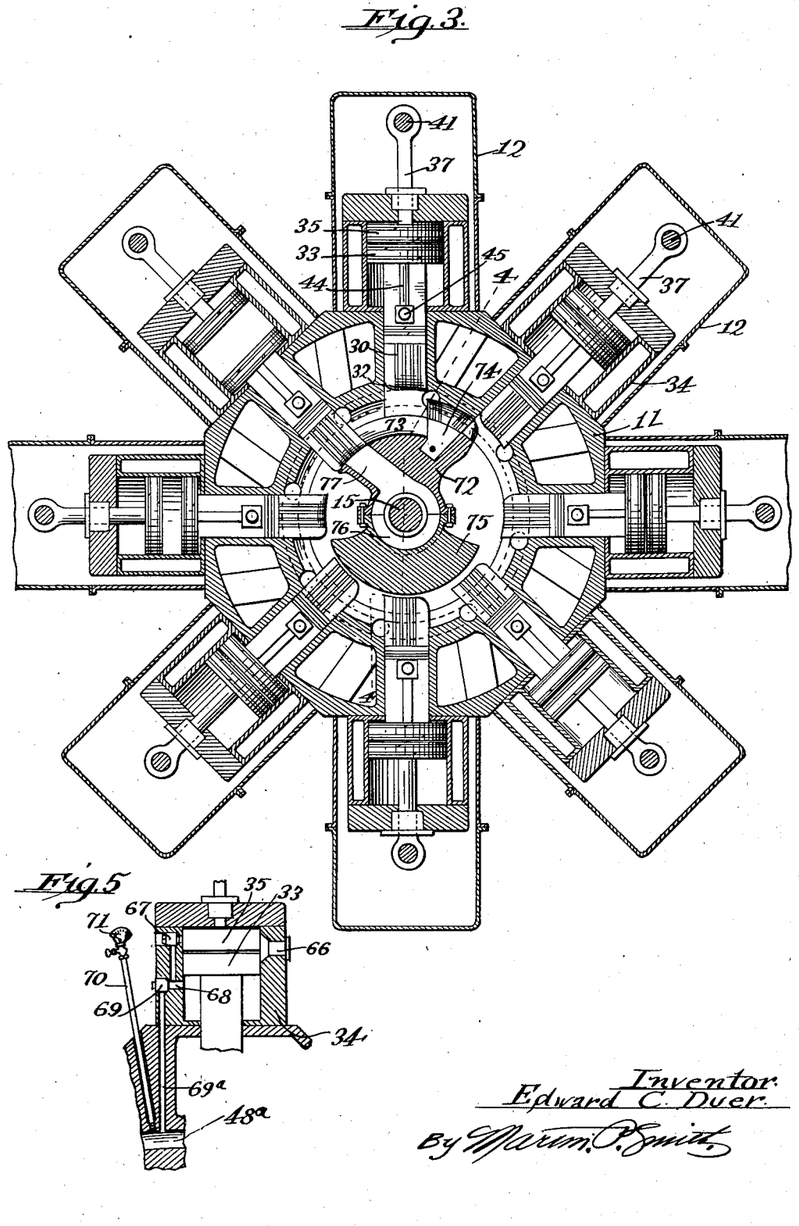
Fig. 3 is a vertical section taken approximately on the line 3—3 of Fig. 1.
Fig. 5 is a sectional view taken lengthwise through one of the air compressing cylinders forming a part of my improved engine and showing the arrangement of the check valves therein.
Figure 4:
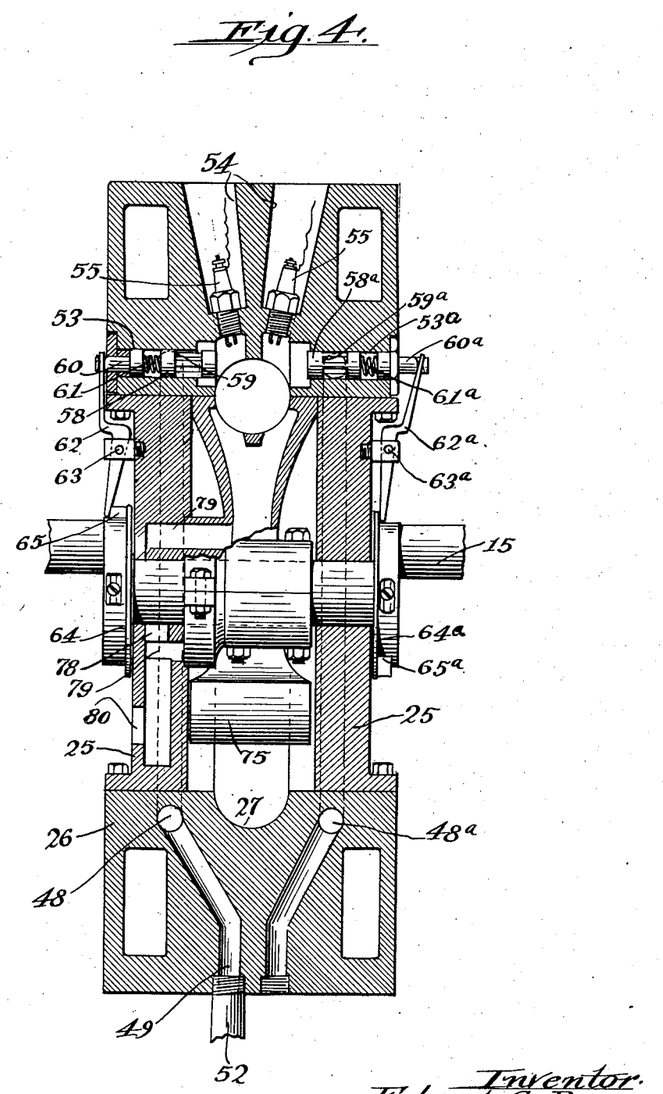
Fig. 4 is an enlarged transverse section taken approximately on the line 4—4 of Fig. 3.

Leading outwardly from the air duct 48ª is a pipe 70 on the outer end of which is located a pressure regulating valve 71. The constructions just described are illustrated in Fig. 5.

On the inward stroke of piston 33 air is drawn through inlet check valve 66 into the chamber between pistons 33 and 35 and after piston 33 passes duct 68 that leads to check valve 69, piston 35 moves inward so as to force the air between the pistons 33 and 35 out through duct 68 and check valve 69, thence through duct 69ª to the circulating duct 48ª.

On the outward movement of piston 35 air in the chamber between said piston and the head of cylinder 34 is forced out past check valve 67, thence through duct 68, check valve 69 and duct 69ª to main circulating duct 48ª.

This pumping action takes place in the chamber that is developed by the pistons 33 and 35 as piston 33 moves inward and the secondary pumping action takes place in that portion of the chamber between piston 35 and the head of the cylinder.

Secured in any suitable manner on the crank shaft 15 between the walls 25 is a rotor that is preferably formed in two parts, one part 72 is provided in its outer face with a channel shaped groove 73 that cooperates with a channel 27 in forming a combined combustion and expansion chamber and secured on one end of this member 72 is a head 74, the outer portion of which occupies the channel 27 and traverses the same while the engine is in operation. The opposite part 75 of the rotor functions as a counterbalancing weight and this member does not contact with the inner faces of the side plates 25, thus reducing friction.

Formed in the inner portions of the members 72 and 75 is an exhaust chamber 76 and leading from the outer face of the rear portion of channel 73 in rotor member 72 to this exhaust chamber is an exhaust duct 77.

Formed through one side of the hub portion of the rotor and leading outwardly from chamber 76 is a duct 78 that communicates with a ring shaped chamber 79 in the adjacent side plate 25 and leading from this chamber 79 outwardly to atmosphere or to an exhaust manifold is a duct 80.

Fixed on shaft 15 within the housing 10 is a gear wheel 81, with which engages the pinion of a starting motor, thus providing means for imparting rotary motion to the crank shaft to start the engine.

The operation of my improved rotary internal combustion engine is as follows:

While the engine is in operation, the connections from crank 18 to the pistons 19, reciprocate the latter in their cylinders 14 and gaseous fuel is drawn from a source of supply through pipes 22 past check valves 24 into the ends of the piston chambers and as the pistons reciprocate within said chambers this gaseous fuel is compressed and discharges piston check valves 51 through pipe 52 to the common fuel distributing duct 48. The head 74 of the rotor traverses the channel 27 and immediately after the rear end of said head passes the inner end of each valve chamber 53 cam lug 65 passes the inner end of the corresponding lever 62, thereby swinging said lever on its fulcrum to move the corresponding piston valve inwardly so that a charge of gaseous fuel will pass from duct 48 through the ports 59 of balanced valve 58 into the chamber immediately behind head 74.

Immediately following this discharge of a gaseous fuel charge into the combustion chamber behind head 74, the pins 45 associated with the adjacent abutment 30 ride off the blocks 47 which previously moved the abutment outward to its limit of movement and the tension of springs 46 act to instantly pull the abutment inwardly so as to provide a relatively fixed head for the combustion chamber directly to the rear of the head of rotor 74.

Cam lug 65ª rides beneath the inner end of lever 62ª, thereby swinging the latter on its fulcrum and moving piston valve 58ª inwardly so as to permit a charge of compressed air from duct 48ª to pass into the combustion chamber between the abutment and rotor head 74 and which air mixes with the charge of gaseous fuel previously admitted to the combustion chamber.

Immediately after the admission of the charge of compressed air the timing mechanism associating with the ignition system causes a spark to be produced between the terminals of the spark plugs 55 that project into the combustion chamber and the gaseous fuel charge is ignited to drive the rotor head forwardly and such action is repeated each time the rotor head passes the inner ends of the abutments.

Immediately after the rotor head passes the next adjacent abutment, the outer end of exhaust duct is brought into communication with the combustion chamber in which combustion of the gaseous fuel charge took place as just described and the products of combustion will pass through port 77 to chamber 76 and from thence to port 78, chamber 79 and port 80 to atmosphere or to an exhaust manifold.

As the rotor is thus rotated by successive power impulses produced as a result of expansion of ignited gaseous fuel charges in the combustion chamber to the rear of the rotor head, the crank shaft 15 will be rotated and rotary motion and power may be taken from one or both ends of the crank shaft.

The cranks 17 provide means for actuating the arms 39 and 42 that carry the adjustable lugs 47 and which latter engage and move outward, the arms 45 that are connected to pistons 33 and abutments 30. Thus the abutments are moved outwardly by the arms 39 and 42 and the parts associated therewith and said abutments are drawn inwardly at the proper times by springs 46 and which action occurs when the arms 45 ride off the adjustable lugs 47.

On the inward movement of each abutment 30 and its piston 33, the suction produced in cylinder 34 below piston 35 draws atmospheric air into the piston chamber through inlet valve 66 and following this action piston 35 is moved inwardly by the arms 39, 42 and cranks 17 and the air drawn into the piston chamber between the pistons 33 and 35 will be forced out through check valve 69, thence through pipe 69ª, to the common compressed air duct 48ª.

As piston 35 moves inwardly through cylinder 34 atmospheric air will be drawn into the chamber through inlet check valve 66 and on the succeeding outward movement of piston 35 this air will be forced out through check valve 67, duct 68, check valve 69 and pipe 69ª to the common compressed air duct 48ª.

As a result of the operations just described, a supply of compressed air is constantly maintained in duct 48ª and from such duct the compressed air is admitted at the proper time intervals through the valves 58ª into the combustion chambers to mix with the gaseous fuel charges therein just prior to ignition.

In some instances it may be found desirable to compress the air to the point where the same when admitted to the combustion chamber will ignite the fuel charge therein and such arrangement will permit liquid fuel to be utilized in the operation of the engine.

In the event that the pressure of compressed air within the duct 48ª becomes greater than the required or desired pressure, such high or abnormal pressure may be relieved by the pressure regulating valve 71.

Any suitable means may be provided for lubricating the various operating parts of my improved engine and while no lubricating means is shown or described I prefer to utilize a system wherein liquid lubricant is forced under pressure through suitable ducts to the points and surfaces that require lubrication.

Thus it will be seen that I have provided a rotary internal combustion engine that is relatively simple in construction, capable of being readily assembled or taken apart and which is highly effective in the economical production of power.

It will be understood that minor changes in the size, form and construction of the various parts of my improved rotary internal combustion engine may be made and substituted for those herein shown and described without departing from the spirit of my invention, the scope of which is set forth in the appended claims.

I claim as my invention:

1. In a rotary internal combustion engine, a housing provided on its inner surface with a circumferential channel, a crank shaft journaled in and passing through said housing, a rotor secured to said crank shaft, a head on said rotor, which head is positioned in the channel in said housing, said rotor being provided with channel to the rear of said head that registers with the channel in the housing, a series of reciprocating abutments radially disposed about the housing, the inner ends of which abutments are adapted to enter the channel in the rotor, pins projecting laterally from said abutments, radially disposed arms having their inner ends mounted on cranks of said crank shaft, radially movable axes to which the outer ends of said arms are pivotally connected, blocks mounted on said arms and adapted during the swinging reciprocating movements of the arms to engage beneath the pins of said abutments and to move the same radially outward and retractile springs connected to said abutments for moving the same inwardly after said pins ride off said blocks.

2. In a rotary internal combustion engine, a housing provided on its inner surface with a circumferential channel, a crank shaft journaled in and passing through said housing, a rotor secured to said crank shaft, a head on said rotor, which head is positioned in the channel in said housing, said rotor being provided with channel to the rear of said head that registers with the channel in the housing, a series of reciprocating abutments radially disposed about the housing, the inner ends of which abutments are adapted to enter the channel in the rotor, pins projecting laterally from said abutments, radially disposed arms having their inner ends mounted on cranks of said crank shaft, radially movable axes to which the outer ends of said arms are pivotally connected, blocks mounted on said arms and adapted during the swinging reciprocating movements of the arms to engage beneath the pins of said abutments and to move the same radially outward, retractile springs connected to said abutments for moving the same inwardly after said pins ride off said blocks, valve controlled gaseous fuel ducts leading into the channel on the interior of said housing and valve controlled compressed air ducts leading to said channel.

3. In a rotary internal combustion engine, a housing provided on its inner surface with a circumferential channel, a crank shaft journaled in and passing through said housing, a rotor secured to said crank shaft, a head on said rotor, which head is positioned in the channel in said housing, said rotor being provided with channel to the rear of said head that registers with the channel in the housing, a series of reciprocating abutments radially disposed about the housing, the inner ends of which abutments are adapted to enter the channel in the rotor, pins projecting laterally from said abutments, radially disposed arms having their inner ends mounted on cranks of said crank shaft, radially movable axes to which the outer ends of said arms are pivotally connected, blocks mounted on said arms and adapted during the swinging reciprocating movements of the arms to engage beneath the pins of said abutments and to move the same radially outward, retractile springs connected to said abutments for moving the same inwardly after said pins ride off said blocks, valve controlled gaseous fuel ducts leading into the channel on the interior of said housing, valve controlled compressed air ducts leading to said channel and means actuated by said crank shaft for imparting opening movement to the valves in said valve controlled ducts.

4. In a rotary internal combustion engine, a housing, a crank shaft journaled in said housing, a rotor carried by the crank shaft and arranged within said housing, the inner periphery of the housing and a portion of the periphery of the rotor having coinciding channels, a head carried by the rotor in front of the channel thereon, which head is adapted to traverse the channel in the housing, cylinders disposed radially around the housing, pistons arranged for operation within said cylinders, abutments carried by said pistons and projecting into the housing, pins projecting laterally from said abutments, radially disposed arms having their inner ends mounted on cranks of said crank shaft, radially movable axes to which the outer ends of said arms are pivotally connected, blocks mounted on said arms and adapted during the swinging reciprocating movements of the arms to engage beneath the pins of said abutments and to move the same radially outward said housing being provided with a gaseous fuel supply duct and with a compressed air supply duct, said ducts having communication with the channel on the interior of the housing and valves for controlling the flow of gaseous fuel and compressed air from said supply ducts into the channel within the housing.

5. In a rotary internal combustion engine, a housing, a crank shaft journaled in said housing, a rotor carried by the crank shaft and arranged within said housing, the inner periphery of the housing and a portion of the periphery of the rotor having coinciding channels, a head carried by the rotor in front of the channel thereon, which head is adapted to traverse the channel in the housing, cylinders disposed radially around the housing, pistons arranged for operation within said cylinders, abutments carried by said pistons and projecting into the housing, pins projecting laterally from said abutments, radially disposed arms having their inner ends mounted on cranks of said crank shaft, radially movable axes to which the outer ends of said arms are pivotally connected, blocks mounted on said arms and adapted during the swinging reciprocating movement of the arms to engage beneath the pins of said abutments and to move the same radially outward said housing being provided with a gaseous fuel supply duct and with a compressed air supply duct, said ducts having communication with the channel on the interior of the housing, valves for controlling the flow of gaseous fuel and compressed air from said supply ducts into the channel within the housing and means actuated from the crank shaft for actuating said valves.

6. A rotary internal combustion engine as set forth in claim 5 and with means actuated by the crank shaft and cooperating with the pistons of the abutments for compressing gaseous fuel and delivering same to the gaseous fuel supply duct in the housing.

7. A rotary internal combustion engine as set forth in claim 5 and means arranged in the radially disposed cylinders and cooperating with the pistons of said abutments for compressing air that is delivered to the compressed air duct in said housing.

8. In a rotary internal combustion engine, a housing, a crank shaft journaled therein, a rotor fixed on said crank shaft within said housing, the inner periphery of the housing and a portion of the crank shaft having cooperating channels, a head carried by the rotor at the forward end of the channel therein, a series of radially disposed abutments mounted for reciprocating movement on the housing and adapted to enter the channel on the interior thereof, pins projecting laterally from said abutments, radially disposed arms having their inner ends mounted on cranks of said crank shaft, radially movable axes to which the outer ends of said arms are pivotally connected, blocks mounted on said arms and adapted during the swinging reciprocating movement of the arms to engage beneath the pins of said abutments and to move the same radially outward valve chambers formed in the housing and communicating with the channel therein, a gaseous fuel supply duct communicating with certain of said valve chambers, a compressed air supply duct communicating with other of said valve chambers and spring pressed balanced piston valves arranged for operation within said valve chambers.

9. A rotary internal combustion engine as set forth in claim 8, with means connected to said radially disposed arms and cooperating with the abutments for compressing air and delivering same to said gaseous fuel supply duct.

10. In a rotary internal combustion engine as set forth in claim 8, with means for compressing gaseous fuel and delivering same to the gaseous fuel supply duct and means for compressing air and delivering same to the compressed air supply duct.

11. In a rotary internal combustion engine, a housing, a crankshaft journaled therein, a rotor fixed on said crank shaft within said housing a head carried by said rotor, a circumferential channel formed within the housing, which channel is traversed by the head on the rotor, a series of radially disposed abutments arranged for reciprocation through the wall of the housing adjacent to the channel therein, outwardly projecting arms carried by each abutment, retractile springs connected to said arms, radially disposed arms journalled on the cranks of the crank shaft cylinders arranged in alignment with said abutments, pistons arranged for operation within said cylinders beyond said abutments, rods projecting outwardly from said pistons, transversely disposed members carrried by the outer ends of said rods, said radially disposed arms being pivotally connected to the ends of said transversely disposed members and blocks adjustably mounted on said arms and adapted to engage the outer ends of the arms that project from said abutments for moving said abutments radially outward.

12. In a rotary internal combustion engine, a housing, a crank shaft journaled therein, a rotor fixed on the crank shaft within said housing, a head on said rotor, a circumferential channel formed within the housing, which channel is traversed by the head on the rotor, a gaseous fuel duct communicating with said channel, a balanced valve arranged in said duct, adjustable means actuated from the crank shaft for imparting opening movement to said valve, a compressed air duct communicating with said channel, a balanced valve arranged in said compressed air duct adjustable means actuating from the crank shaft for imparting opening movement to the valve in said compressed air duct a series of cylinders radially disposed about the housing, a pair of pistons arranged for reciprocation within each cylinder, an abutment secured to the inner one of each pair of pistons, the inner ends of which abutments are adapted to enter the channel in the housing, means actuating by the crank shaft and connected to the outer one of each pair of pistons for reciprocating the same, said cylinders being provided with valve controlled air inlet and outlet ducts and said outlet ducts being connected to said compressed air duct.

13. In a rotary internal combustion engine, a housing provided in its side portions with separate circumferential gaseous fuel and compressed air ducts, a circumferential channel formed within said housing, a rotor arranged for operation within the housing, a head on said rotor, which head traverses the circumferential channel in the housing, valve chambers intersecting the gaseous fuel compressed air ducts and balance spring pressed piston valves arranged for reciprocation within said valve chambers for controlling the passage of gaseous fuel and compressed air into the channel within the housing, a series of cylinders radially disposed about the housing, a pair of pistons arranged for operation within each cylinder, means actuated by the crank shaft for imparting reciprocating movement to the outer piston of each pair, said cylinders being provided with valve controlled air inlet and outlet ducts, said outlet ducts being connected to said circumferential compressed air duct, means actuated by the crank shaft for compressing gaseous fuel and means for delivering said gaseous fuel to the circumferential gaseous fuel duct.

14. In a rotary internal combustion engine, a housing provided with a rotor chamber, said chamber being provided with a circumferential channel, a crank shaft passing through said housing and through the center of the chamber therein, a rotor secured to said crank shaft, a portion of the periphery of which rotor is provided with a channel shaped groove that cooperates with the channel in the chamber in the housing to form a combined combustion and expansion chamber, a head on the rotor at one end of the channel in the periphery thereof and a counterbalancing weight formed on the rotor diametrically opposite from said groove and head.

In testimony whereof I affix my signature.

EDWARD C. DUER.